(12) United States Patent
Darthenay et al.

(10) Patent No.: US 6,191,816 B1
(45) Date of Patent: Feb. 20, 2001

(54) INTERFACE CIRCUIT FOR A VIDEO CAMERA

(75) Inventors: Frédéric Darthenay, Saint-Aubin/Mer; Richard Morisson, Caen, both of (FR)

(73) Assignee: U.S. Philips Corporation, New York, NY (US)

( * ) Notice: Under 35 U.S.C. 154(b), the term of this patent shall be extended for 0 days.

(21) Appl. No.: 08/988,598

(22) Filed: Dec. 11, 1997

(30) Foreign Application Priority Data

Dec. 13, 1996 (FR) .................................................. 96 15372

(51) Int. Cl.[7] .................................................... H04N 5/217
(52) U.S. Cl. ............................ 348/241; 348/243; 348/312
(58) Field of Search .................................. 348/312, 241, 348/243

(56) References Cited

U.S. PATENT DOCUMENTS

| | | | |
|---|---|---|---|
| 5,086,344 | * | 2/1992 | D'Luna et al. ....................... 348/250 |
| 5,105,276 | * | 4/1992 | Schrock ................................ 348/241 |
| 5,488,415 | * | 1/1996 | Uno ...................................... 348/241 |
| 5,757,440 | * | 5/1998 | Mangelsdorf ........................ 348/243 |
| 6,018,364 | * | 1/2000 | Mangelsdorf ........................ 348/241 |

* cited by examiner

Primary Examiner—Wendy Garber
Assistant Examiner—Mitchell White
(74) Attorney, Agent, or Firm—Tony E. Piotrowski

(57) ABSTRACT

The invention relates to an interface circuit FE intended to receive a pseudo-periodical input signal Vin having a reference level and a video level, and to supply a signal Vs having a level which is representative of the difference between the reference level and the video level, said interface circuit comprising:

Figure 1:
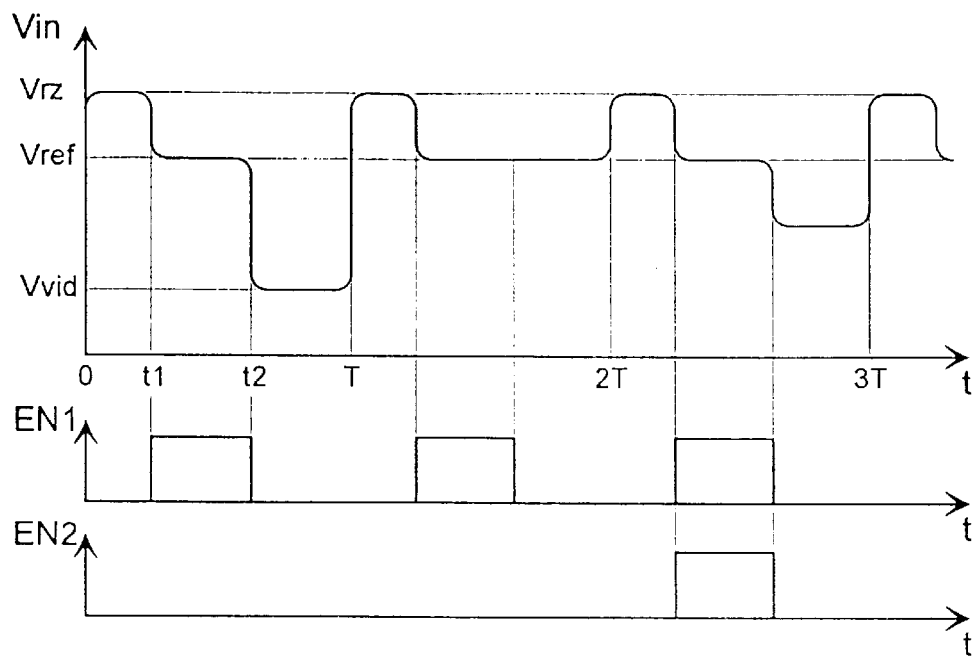

two sampling branches BR1 and BR2 simultaneously supplying the reference level and the video level, and a subtracter SUB having inputs which receive the outputs of the branches BR1 and BR2.

According to the invention, the inputs of the branches BR1 and BR2 are jointly connected via a first capacitance C1 to the input of the interface circuit FE, which comprises control means CM allowing adjustment of the values of the signals at the inputs of the subtracter SUB so that they are equal when they are representative of one and the same reference level.

3 Claims, 2 Drawing Sheets

INTERFACE CIRCUIT FOR A VIDEO CAMERA

The invention relates to an interface circuit having an input intended to receive a pseudo-periodical input signal, each pseudo-period of which comprises at least a first and a second consecutive time interval, said input signal having a reference level during the first time interval and a video level during the second time interval, and an output intended to supply a signal having a level which is representative of the difference between the reference level and the video level assumed by the input signal in the course of one and the same pseudo-period, said interface circuit comprising:

a first and a second sampling branch each constituted by series-arranged trackand-hold circuits, each having an input and an output, each branch having an input and an output constituted by the input of its first tack-and-hold circuit and the output of its last track-and-hold circuit, respectively, the first branch comprising one track-and-hold circuit more than the second, the input of each branch being intended to receive the input signal from the interface circuit, a subtracter having a first input connected to the output of the first branch, a second input connected to the output of the second branch and an output constituting the output of the interface circuit, a DC level regulation loop comprising a first capacitance arranged between the input of one of the branches and the input of the interface circuit, and a first comparator having a first input connected to the output of one of the sampling branches, a second input intended to receive a regulation signal having a predetermined value and an output intended to control the conduction of a current through the first capacitance.

The interface circuits which are currently used for realizing the function described in the opening paragraph comprise two control loops, the first regulating the DC component of the input signal during the first time interval, i.e. when the input signal has the reference level, the second regulating the DC component of the input signal during the second time interval, i.e. when the input signal has the video level. The signal at the output of the first branch, whose value is representative of the reference level, is compared with a first predetermined value and adjusts, during the first time interval, the voltage at the terminals of a capacitance arranged between the input of the first branch and the input of the interface circuit. The signal at the output of the second branch, whose value is representative of the video level, is compared with a second predetermined value and adjusts, during the second time interval, the voltage at the terminals of a capacitance arranged between the input of the second branch and the input of the interface circuit. These two regulation loops necessarily have similar feedback times because both of them must act in the course of each pseudo-period. The correction realized by the first control loop may thus modify the value of the voltage at the terminals of the capacitance of the second control loop, and conversely. In high-frequency applications, in which the pseudo-period of the input signal of the interface circuit is very short, the feedback time of each of the two loops must be very small. The interaction described above may then cause oscillations of the DC components of the signals at the inputs of the sampling branches, which oscillations are detrimental to the operation of the interface circuit.

It is an object of the invention to remedy this drawback by providing an interface circuit in which the inputs of the two sampling branches receive one and the same signal whose DC component is controlled by means of a single regulation loop.

To this end, an interface circuit according to the invention is characterized in that the inputs of the first and second branches are interconnected, forming a junction point connected via the first capacitance to the input of the interface circuit, and in that the interface circuit also comprises control means arranged between the sampling branches and the subtracter, which means are activated when the levels of the signals at the outputs of the first and second branches correspond to the reference levels, said control means allowing adjustment of the values of the signals at the inputs of the subtracter in order that said values are equal.

In such an interface circuit, the control loop and the control means do not act directly on the same signals, which enables to limit the risks for oscillations to occur. Moreover, if the feedback time of the control loop is necessarily short, because a regulation of the DC component of the input signal of the sampling branches must be carried out in each pseudo-period of the input signal of the interface circuit, the feedback time of the control means may be longer because these means only act in the case where the video level of the input signal of the interface corresponds to the reference level. The difference between the feedback times of the two loops all the more limits the risk of interaction between these loops.

An embodiment of the invention provides an interface circuit as described above, which is characterized in that the control means comprise:

a second comparator having a first and a second input connected to the outputs of the first and second sampling branches, respectively, and an output connected via a second capacitance to a fixed voltage terminal, and an offset module having a signal input connected to the output of one of the sampling branches, a signal output connected to one of the inputs of the subtracter, the other input of which is connected to the output of the other sampling branch, the offset module also having a control input connected to the output of the second comparator and being intended to generate, between its signal input and its signal output, a potential difference whose value depends on the value of the signal received at the control input.

In such an interface circuit, a difference between the values of the DC components of the output signals of the sampling branches is detected by means of the second comparator and immediately corrected thanks to the offset module which may be realized in various forms.

In an embodiment of the invention, which is particularly advantageous because of its simplicity, an interface circuit as described above is characterized in that the offset module comprises:

a resistor arranged between the signal input and the signal output, a third comparator having an output, a first input intended to receive a control signal having a predetermined value and a second input constituting the control input of the offset module, and a variable current source having an output connected to one of the terminals of the resistor and being intended to supply a control current whose direction and value are controlled by the state of the output of the third comparator.

The correction of the difference between the values of the DC components is thus easily realized by generating a voltage drop between the output of one of the sampling branches and the corresponding input of the subtracter.

An interface circuit as described above may be used for receiving and reshaping all types of pseudo-periodical signals having a reference level and a video level in each pseudo-period and from which useful information, consisting of the difference between these levels, must be obtained. The invention thus also relates to a video camera comprising:

a device for detecting and converting light into analog electronic signals of a pseudo-periodical kind, an input stage having an input intended to receive said analog electronic signals, and an output intended to supply an analog video signal, an amplifier device having an output and an input intended to receive the video signal, and a processing unit intended to process the signal at the output of the amplifier device, characterized in that the input stage comprises an interface circuit as described above.

These and other aspects of the invention are apparent from and will be elucidated with reference to the embodiments described hereinafter.

Figure 2:
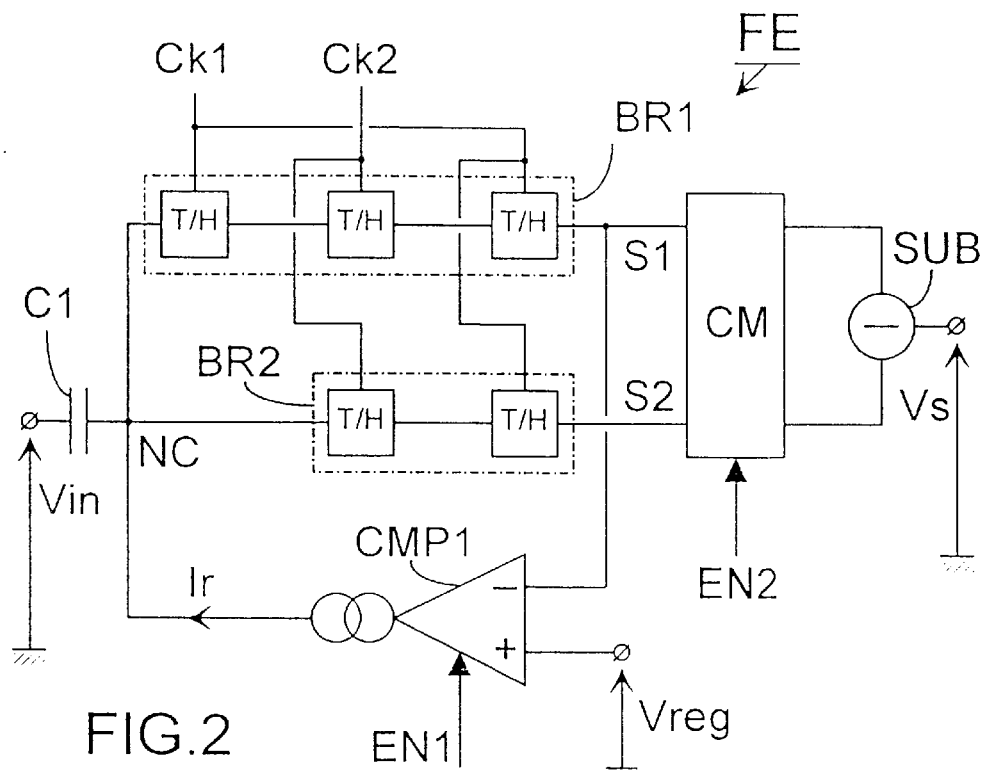
Figure 3:
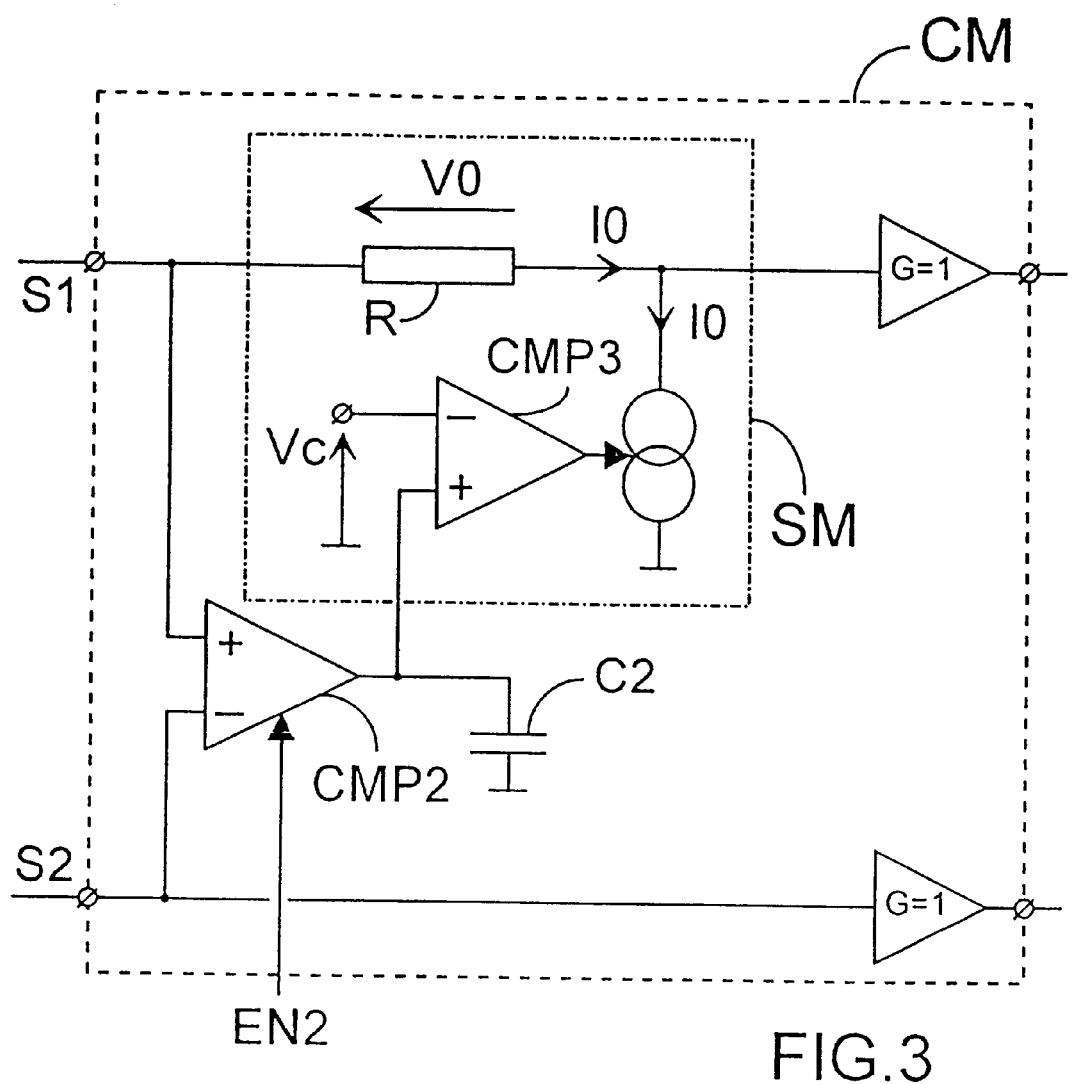
Figure 4:
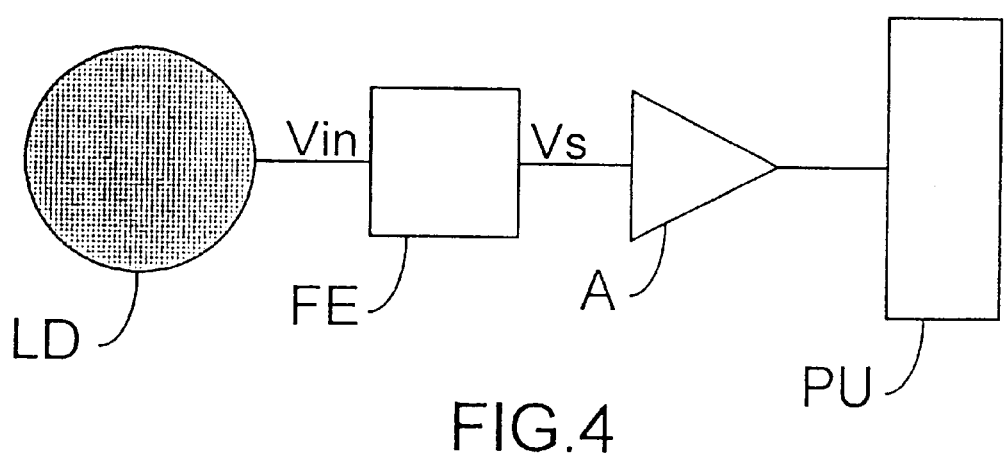

In the drawings:

FIG. 1 is a set of chronograms illustrating the development with respect to time of the input signal of the interface circuit, and of validation signals within the circuit, FIG. 2 is an electric circuit diagram partially showing an interface circuit according to the invention, FIG. 3 is an electric circuit diagram partially showing the control means in an interface circuit in accordance with an advantageous embodiment of the invention, and FIG. 4 is a functional diagram partially showing a video camera in which an interface circuit according to the invention is used.

FIG. 1 shows the waveform of an input signal Vin of the interface circuit. In the course of each pseudo-period having a duration of T, this input signal Vin successively has an initialization level Vrz whose function is to announce the start of a new pseudo-period, a reference level Vref which may correspond, for example, to the black level during a first time interval [t1; t2], and a video level Vvid during a second time interval [t2; T]. The useful information in the input signal Vin is constituted by the difference between the reference level Vref and the video level Vvid. The function of the interface circuit is thus to extract a signal which is representative of this difference from the input signal Vin. The signal EN1, referred to as first enable signal, is active when the input signal Vin has a reference level Vref. The signal EN2, which is referred to as second enable signal, assumes, in this example, an active state during the third pseudo-period because the input signal Vin has presented a video level Vvid equal to the reference level Vref during the previous pseudo-period. The enable signals EN1 and EN2 are elaborated on the basis of the input signal Vin by means which are well known to those skilled in the art. The frequency of the first enable signal EN1 is equal to 1/T because an active level of EN1 occurs at each pseudo-period. The frequency of the second enable signal EN2 is necessarily much smaller than 1/T because the cases where the video level Vvid is equal to the reference level Vref are rarer.

FIG. 2 shows diagrammatically an interface circuit FE in accordance with the invention. This circuit comprises a first sampling branch BR1 and a second sampling branch BR2, each constituted by series-arranged track-and-hold circuits T/H. Each branch BR1 or BR2 has an input and an output constituted by the input of its first track-and-hold circuit T/H and the output of its last track-and-hold circuit T/H, respectively. The inputs of the first and second branches BR1 and BR2 are interconnected, forming a junction point NC, and are intended to receive the input signal Vin of the interface circuit FE. The first branch BR1 comprises three track-and-hold circuits T/H, while the second branch BR2 only comprises two. The first and third track-and-hold circuits T/H of the first branch BR1 and the second track-and-hold circuit T/H of the second branch BR2 are rhythmed by a first clock signal Ck1 which is active during the first time interval [t1; t2]. The second track-and-hold circuit T/H of the first branch and the first track-and-hold circuit of the second branch BR2 are rhythmed by a second clock signal Ck2 which is active during the second time interval [t2; T]. In order to avoid any risk of loss of information, the active levels of the clock signals Ck1 and Ck2 may overlap each other. A reference level Vref must thus be sampled and memorized by three track-and-hold circuits T/H before reaching the output of the first sampling branch BR1. The video level Vvid which is present in the input signal Vin during the same pseudo-period must be sampled and memorized only by two track-and-hold circuits T/H before reaching the output of the second sampling branch BR2. With respect to the reference level, the video level Vvid has a delay whose duration is equal to the first time interval [t1; t2] and, as a result, the output signals S1 and S2 of the sampling branches BR1 and BR2 simultaneously supply signals which are respectively representative of a reference level Vref and a video level Vvid produced by the input signal Vin during one and the same pseudo-period. The interface circuit FE comprises a subtracter SUB having a first input connected to the output of the first branch BR1, a second input connected to the output of the second branch BR2 and an output constituting the output of the interface circuit. This output supplies a signal Vs resulting from the difference between the signals S1 and S2 at the output of the first and second sampling branches BR1 and BR2. This output signal Vs is representative of the difference between the reference level Vref and the video level Vvid and thus restores the useful information contained by the input signal Vin. The interface circuit FE also comprises a regulation loop for regulating the DC level of the signal at the inputs of the branches BR1 and BR, which comprises a first capacitance C1 arranged between the junction point NC and the input of the interface circuit FE, and a first comparator CMP1 having a first input which is connected to the output of the first sampling branch BR1, a second input which receives a regulation signal Vreg having a predetermined value, and an output which controls the conduction of a current Ir through the first capacitance C1 when the first enable signal EN1 is active. The function of this regulation loop is to maintain an average DC level at the input of the sampling branches, which is compatible with the maximum input amplitudes of the sample-and-hold circuits. This regulation is obtained by comparing the value of the output signal S1 of the first sampling branch BR1 with a threshold value fixed by the regulation signal Vreg. If the value of S1 is smaller than that of Vreg, the output of the comparator CMP1 commands the injection of a current Ir into the first capacitance C1, in order to increase the voltage at the terminals thereof, thus increasing the value of the DC component of the signal at the inputs of the first and second branches BR1 and BR2. Conversely, when the value of S1 is higher than that of Vreg, the output of the comparator CMP1 commands the absorption of a current Ir from the first capacitance C1 in order to reduce the voltage at the terminals thereof, thus reducing the value of the DC component of the signal at the inputs of the first and second branches BR1 and BR2. It should be noted that it is possible to realize such a control of the DC level by comparing, during the second time interval [t2; T], the value of the output signal S2 of the second branch BR2 with another predetermined regulation value. The two sampling branches BR1 and BR2 receive the same input signal whose average value of the DC component is controlled by the regulation loop described above. Each track-and-hold circuit T/H may introduce an offset between the DC level of the signal which it receives at its input and that which it supplies at its output. Moreover, the number of sample-and-hold circuits T/H traversed by the input signal is different from one branch to the other. The interface circuit FE thus comprises control means CM arranged between the sampling branches BR1 and BR2 and the subtracter SUB and activated by means of the second enable signal EN2, i.e. when the values of the output signals S1 and S2 of the first and second branches BR1 and BR2, representative of a reference level Vref and a video level Vvid, respectively, must be equal. These control means CM allow adjustment of the values of the signals at the inputs of the subtracter in order that said values are equal. Any offset of the voltage between the DC components of the output signals S1 and S2 of the sampling branches BR1 and BR2 can thereby be compensated. Such an offset would otherwise alter the result of the subtraction between the values of the output signals S1 and S2 of said branches, which would induce an error in the value of the useful information Vs supplied at its output by the interface circuit FE.

FIG. 3 shows diagrammatically an embodiment of the control means CM. These control means comprise a second comparator CMP2 having a first and a second input connected to the outputs of the first and second sampling branches BR1 and BR2, respectively, and an output connected via a second capacitance C2 to a fixed voltage terminal constituted, in this example, by this circuit's ground. The comparator CMP2 performs a comparison between the signals S1 and S2 supplied by the outputs of the sampling branches BR1 and BR2. If the second enable signal EN2 is active, the values of S1 and S2 must in theory be equal because both are representative of a same reference level. The amplitude of the possible difference between the values of S1 and S2 is stored at the output of the comparator CMP2 by the second capacitance C2. The voltage at the terminals of said capacitance C2 is used for controlling an offset module CM whose function is to correct the difference detected by the second comparator CMP2, by generating a potential difference VO, whose value depends on the value of the voltage at the terminals of the capacitance C2, between the output of the first branch BR1 and the corresponding input of the subtracter SUB. This offset module comprises a resistor R arranged between the output of the first branch BR1 and the corresponding input of the subtracter SUB to which it is connected via a following stage. A third comparator CMP3 receives at its first input a control signal Vc having a predetermined value. A second input of said comparator CMP3 is connected to the output of the second comparator CMP2. The other input of the subtracter SUB is connected via another following to the output of the second sampling branch BR2. The offset module SM also comprises a variable current source having an output which is connected to one of the terminals of the resistor R and intended to supply a control current IO. The direction and value of the control current IO are controlled by the state of the output of the third comparator CMP3. When, for example, the difference between the values of the signals S1 and S2 at the outputs of the first and second sampling branches BR1 and BR2 is positive and exceeds a threshold determined by the value of the control signal Vc, the output of the third comparator controls the conduction of a current IO as shown in FIG. 3, thus creating a difference of potential VO at the terminals of the resistor R with the effect that the values of the DC components of the signals received by the subtracter at its first and second inputs are rendered equal. This reasoning is easily applicable to the inverse case in which the difference between the values of the signals S2 and S1 at the outputs of the second and first sampling branches BR2 and BR1 is positive and exceeds a threshold determined by the value of the control signal Vc, where the output of the third comparator CMP3 then controls the conduction of a current IO in a direction opposite to that shown in FIG. 3.

Besides, it is also possible, in a variant of the embodiment of the control means CM described above, to connect the inputs of the second comparator CMP2 to the inputs of the subtracter SUB instead of connecting them to the outputs of the sampling branches BR1 and BR2.

FIG. 4 shows diagrammatically a video camera in which the invention is carried into effect. This video camera comprises:

a device LD for detecting and converting light into analog electronic signals Vin of a pseudo-periodical kind, an input stage having an input intended to receive said analog electronic signals Vin and an output intended to supply an analog video signal Vs, an amplifier device A having an output and an input intended to receive the video signal Vs, and a processing unit PU intended to process the signal at the output of the amplifier device.

The input stage of this video camera comprises an interface circuit FE as described above. As the analog electronic signals Vin coming from the detection device Vin have a waveform which is similar to that shown in FIG. 1, such an interface circuit allows a precise generation of the video signal to be used by the processing unit PU after amplification.

What is claimed is:

1. An interface circuit that is capable of receiving a pseudo-periodical input signal, each pseudo-period of which comprises at least a first and a second consecutive time interval, the input signal having a reference level during the first time interval and a video level during the second time interval, and an output signal intended to supply a signal having a level which is representative of the difference between the reference level and the video level assumed by the input signal in the course of one and the same pseudo-period, said interface circuit comprising:

a first and a second sampling branch each constituted by series-arranged track-and-hold circuits, each having an input and an output, each branch having an input and an output constituted by the input of its first track-and-hold circuit and the output of its last track-and-hold circuit, respectively, the first branch comprising one track-and-hold circuit more than the second branch, the input of each branch being intended to receive the input signal from the interface circuit, a subtracter having a first input connected to the output of the first branch, a second input connected to the output of the second branch and an output constituting the output of the interface circuit, a DC level regulation loop comprising a first capacitance arranged between the input of one of the branches and the input of the interface circuit, and a first comparator having a first input connected to the output of one of the sampling branches, a second input intended to receive a regulation signal having a predetermined value and an output intended to control the conduction of a current through the first capacitance, wherein the inputs of the first and second branches are interconnected, forming a junction point connected via the first capacitance to the input of the interface circuit, and control means arranged between the sampling branches and the subtracter, which means are activated when the levels of the signals at the outputs of the first and second branches correspond to the reference levels, the control means allowing for adjustment of the values of the signals at the inputs of the subtracter in order that the values are equal, and wherein the control means includes a second comparator having a first and a second input connected to the outputs of the first and second sampling branches, respectively, and an output connected via a second capacitance to a fixed voltage terminal, and an offset module having a signal input connected to the output of one of the sampling branches, a signal output connected to one of the inputs of the subtracter, the other input of which is connected to the output of the other sampling branch, the offset module also having a control input connected to the output of the second comparator and being intended to generate, between its signal input and its signal output, a potential difference whose value depends on the value of the signal received at the control input.

2. An interface circuit as claimed in claim 1, wherein the offset module includes a resistor arranged between the signal input and the signal output, a third comparator having an output, a first input intended to receive a control signal having a predetermined value and a second input constituting the control input of the offset module, and a variable current source having an output connected to one of the terminals of the resistor and being intended to supply a control current whose direction and value are controlled by the state of the output of the third comparator.

3. A video camera comprising:

a device for detecting and converting light into analog electronic signals of a pseudo-periodical kind, an input stage having an input intended to receive said analog electronic signals, and an output intended to supply an analog video signal, an amplifier device having an output and an input intended to receive the video signal, and a processing unit intended to process the signal at the output of the amplifier device, wherein the input stage comprises an interface circuit as claimed in claim 1.

* * * * *